United States Patent
Yokoyama

(10) Patent No.: US 8,214,683 B2
(45) Date of Patent: Jul. 3, 2012

(54) IMAGE FORMING APPARATUS, CONTROL METHOD, AND STORAGE MEDIUM

(75) Inventor: Hidehiko Yokoyama, Machida (JP)

(73) Assignee: Canon Kabushiki Kaisha (JP)

( * ) Notice: Subject to any disclaimer, the term of this patent is extended or adjusted under 35 U.S.C. 154(b) by 38 days.

(21) Appl. No.: 12/782,402

(22) Filed: May 18, 2010

(65) Prior Publication Data
US 2010/0293411 A1  Nov. 18, 2010

(30) Foreign Application Priority Data

May 18, 2009  (JP) ................................. 2009-119729

(51) Int. Cl.
*G06F 11/00* (2006.01)
(52) U.S. Cl. ........... 714/3; 714/4.12; 714/5.1; 714/6.32; 399/9
(58) Field of Classification Search ............. 714/3, 4.12, 714/5.1, 6.32; 710/302; 399/9
See application file for complete search history.

(56) References Cited

U.S. PATENT DOCUMENTS

| | | | |
|---|---|---|---|
| 7,447,943 B2 * | 11/2008 | Vu et al. ................. | 710/302 |
| 2003/0088805 A1 | 5/2003 | Majni et al. | |
| 2005/0219899 A1 * | 10/2005 | Kishi et al. ............... | 365/185.11 |
| 2006/0085671 A1 * | 4/2006 | Majni et al. ................. | 714/5 |
| 2008/0298819 A1 * | 12/2008 | Ueda .................... | 399/12 |
| 2011/0044703 A1 * | 2/2011 | Fuse ...................... | 399/12 |

FOREIGN PATENT DOCUMENTS

JP  08-202207 A  8/1996

OTHER PUBLICATIONS

1 CN Office Action issued Feb. 29, 2012 for corresponding CN 201010175322.1; English Translation provided.

* cited by examiner

*Primary Examiner* — Robert Beausoliel, Jr.
*Assistant Examiner* — Joseph D Manoskey
(74) *Attorney, Agent, or Firm* — Rossi, Kimms & McDowell LLP

(57) ABSTRACT

An image forming apparatus that can be used even when an access error occurs due to replacement of component elements. When replacement of a component element of the image forming apparatus is detected, it is determined whether or not a predetermined process has been normally carried out on the component element. When it is determined that the predetermined process has not been normally carried out, another process different from the predetermined process is carried out. When the other process has been normally carried out, the predetermined process for the component element is changed to the other process.

3 Claims, 7 Drawing Sheets

IMAGE FORMING APPARATUS, CONTROL METHOD, AND STORAGE MEDIUM

BACKGROUND OF THE INVENTION

1. Field of the Invention

The present invention relates to an image forming apparatus, a control method, and a storage medium, and in particular to an image forming apparatus having a plurality of component elements, a control method, and a computer-readable storage medium storing a program for implementing the method.

2. Description of the Related Art

In recent years, multifunctional peripherals having a plurality of functions such as a copy function of printing information read from originals, a function of storing image information, and a function of sending and receiving data via public lines and networks have become mainstream image forming apparatuses. Accordingly, image forming apparatuses have come to be provided with processing capacities equal to those of information processing apparatuses such as personal computers (PC) and have devices such as a hard disk drive (HDD) connected thereto as in the case of information processing apparatuses.

In an image forming apparatus comprised of a plurality of component elements such as an HDD, when one of the component elements is removed or replaced, and access timing which the component element has is different from access timing which the other component elements have, access cannot be normally made. In this case, there arises a problem that the image forming apparatus provides an error indication and becomes unusable.

To address this problem, there has been disclosed a method in which a status of connection of a peripheral device to the image forming apparatus is checked at power-on, and an error indication is provided when there is a difference between the present connection status and a previous connection status (see, for example, Japanese Laid-Open Patent Publication (Kokai) No. H08-202207).

However, according to the method described in Japanese Laid-Open Patent Publication (Kokai) No. H08-202207, there may be a case where an access error occurs due to a difference in the characteristics of a component element such as a peripheral device before and after replacement thereof, and the image forming apparatus becomes unusable. Therefore, it is required that countermeasures be taken so that the image forming apparatus can be used without an error indication when a difference in the characteristics of a component element is minute.

SUMMARY OF THE INVENTION

The present invention provides an image forming apparatus that can be used even when an access error occurs due to replacement of component elements, a control method, and a computer-readable storage medium storing a program for implementing the method.

Accordingly, in a first aspect of the present invention, there is provided an image forming apparatus that has a component element and carries out a predetermined process on the component element, comprising a detection unit adapted to detect whether the component element is replaced, a determination unit adapted to determine whether the predetermined process has been normally carried out on the component element when the replacement of the component element is detected, an execution unit adapted to carry out another process different from the predetermined process when it is determined that the predetermined process has not been normally carried out, and a changing unit adapted to change the predetermined process for the component element to the other process when the other process has been normally carried out.

Accordingly, in a second aspect of the present invention, there is provided a control method for an image forming apparatus that has a component element and carries out a predetermined process on the component element, comprising a detection step of detecting whether the component element is replaced, a determination step of determining whether the predetermined process has been normally carried out on the component element when the replacement of the component element is detected, an execution step of carrying out another process different from the predetermined process when it is determined that the predetermined process has not been normally carried out, and a changing step of changing the predetermined process for the component element to the other process when the other process has been normally carried out.

Accordingly, in a third aspect of the present invention, there is provided a computer-readable storage medium storing a program for causing a computer to implement a control method for an image forming apparatus that has a component element and carries out a predetermined process on the component element, the control method comprising a detection step of detecting whether the component element is replaced, a determination step of determining whether the predetermined process has been normally carried out on the component element when the replacement of the component element is detected, an execution step of carrying out another process different from the predetermined process when it is determined that the predetermined process has not been normally carried out, and a changing step of changing the predetermined process for the component element to the other process when the other process has been normally carried out.

According to the present invention, when replacement of a component element is detected, and it is determined that a predetermined process has not been normally carried out on the component element, another process different from the predetermined process is carried out. Also, when the other process has been normally carried out, the predetermined process for the component element is changed to the other process. Thus, even when an access error occurs due to replacement of component elements, the image forming apparatus can be used.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof.

Figure 1:
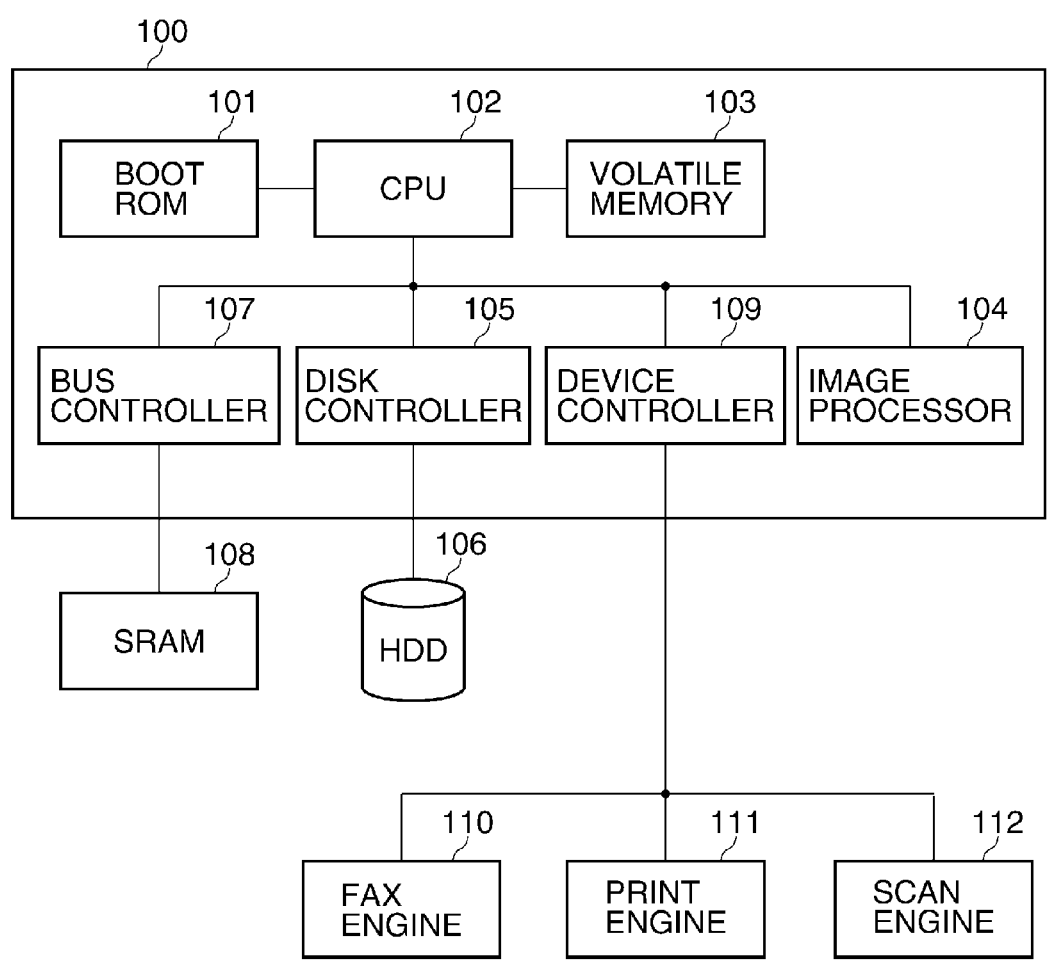
FIG. 1 is a block diagram schematically showing an arrangement of an image forming apparatus according to an embodiment of the present invention.

FIG. 1 is a block diagram schematically showing an arrangement of an image forming apparatus according to an embodiment of the present invention.

Referring to FIG. 1, the image forming apparatus according to the present embodiment has a controller board 100, an SRAM 108, an HOD (hard disk drive) 106, a fax engine 110, a print engine 111, and a scan engine 112.

The controller board 100 controls the image forming apparatus. The controller board 100 has a boot ROM 101, a CPU 102, a volatile memory 103, an image processor 104, a disk controller 105, a bus controller 107, and a device controller 109.

The boot ROM 101 is a nonvolatile memory in which a boot program is stored. The CPU 102 is an arithmetic unit that executes the boot program and other programs. The volatile memory 103 temporarily stores programs and data.

The image processor 104 carries out an image forming process at high speed. The disk controller 105 controls the HDD 106. The bus controller 107 provides interface to a nonvolatile storage device such as the SRAM 108.

The device controller 109 is connected to image forming devices such as the fax engine 110, the print engine 111, and the scan engine 112, and controls these image forming devices to carry out an image forming process.

Figure 2:
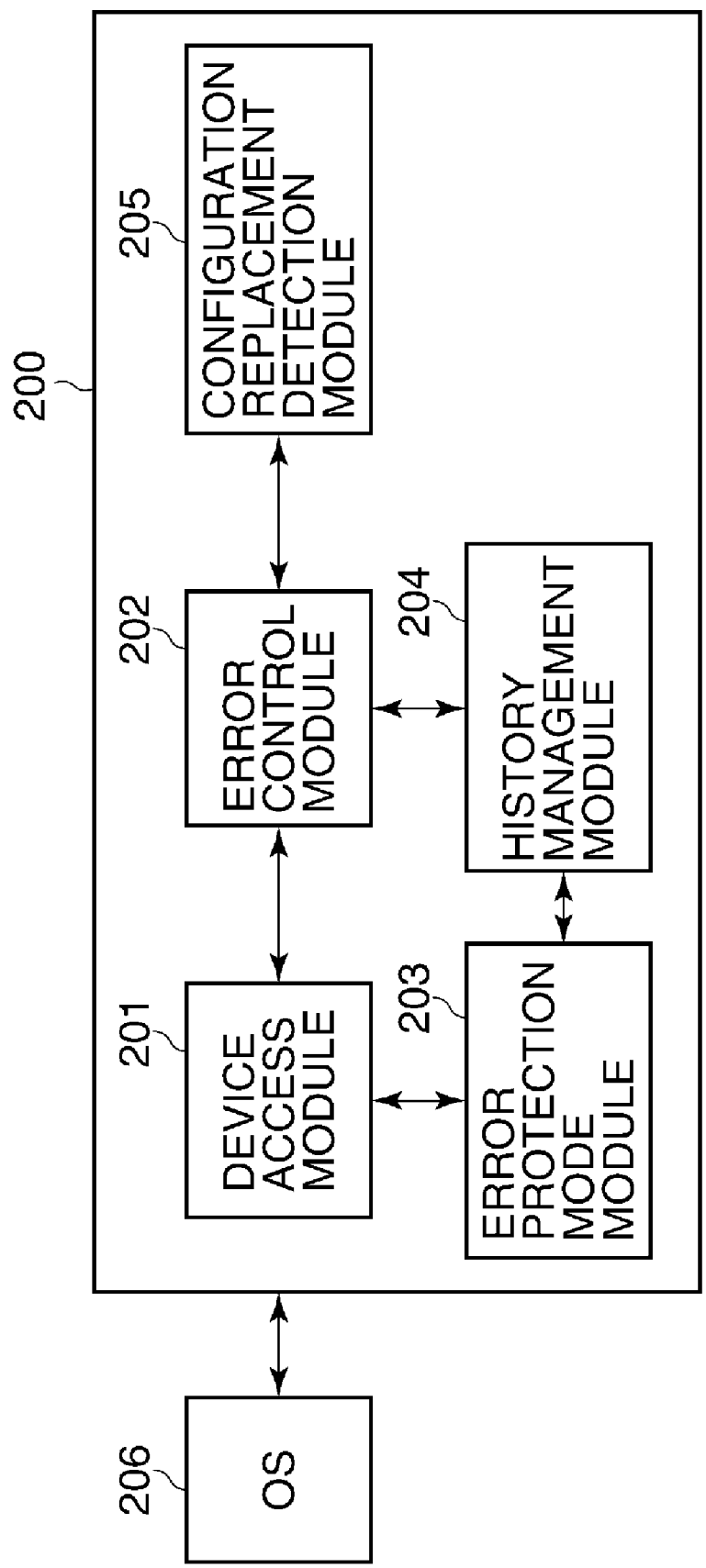
FIG. 2 is a diagram schematically showing an arrangement of a module for a device access process executed by a controller board appearing in FIG. 1.

FIG. 2 is a diagram schematically showing an arrangement of a module for a device access process carried out by the controller board 100 appearing in FIG. 1.

Referring to FIG. 2, the device access process is implemented as a device driver 200. The device driver 200 is called from an OS (operating system) 206 and operates in accordance with requests from the OS 206.

It should be noted that the device driver 200 and the OS 206 are stored in a nonvolatile storage device such as the HDD 106, loaded into the volatile memory 103 at power-on of the controller board 100, and executed by the CPU 102.

The device driver 200 has a device access module 201, an error control module 202, an error protection mode module 203, a history management module 204, and a configuration replacement detection module 205.

The device access module 201 controls devices such as the HDD 106. The error control module 202 provides an error indication on a display unit which the image forming apparatus has such as an LCD panel according to an error state. The error protection mode module 203 is called in a case where the error control module 202 gives an instruction to carry out an access process different from usual without immediately providing an error indication. The history management module 204 stores states of processing by the error protection mode module 203 as a history in a nonvolatile storage device such as the SRAM 108.

The configuration replacement detection module 205 detects component elements connected to the image forming apparatus whenever the image forming apparatus is activated, compares the detection result with information stored in a nonvolatile storage device such as the SRAM 108, and when there is a difference, records in the SRAM 108 that there has been configuration replacement. Also, the configuration replacement detection module 205 returns information indicative of whether or not there has been configuration replacement to the OS 206 in accordance with a request from the OS 206.

A description will now be given of the device access process according to the present embodiment by referring to flowcharts of FIGS. 3 to 5 with access to the HDD 106 of the controller board 100 which the image forming apparatus in FIG. 1 has being taken as an example.

Figure 3:
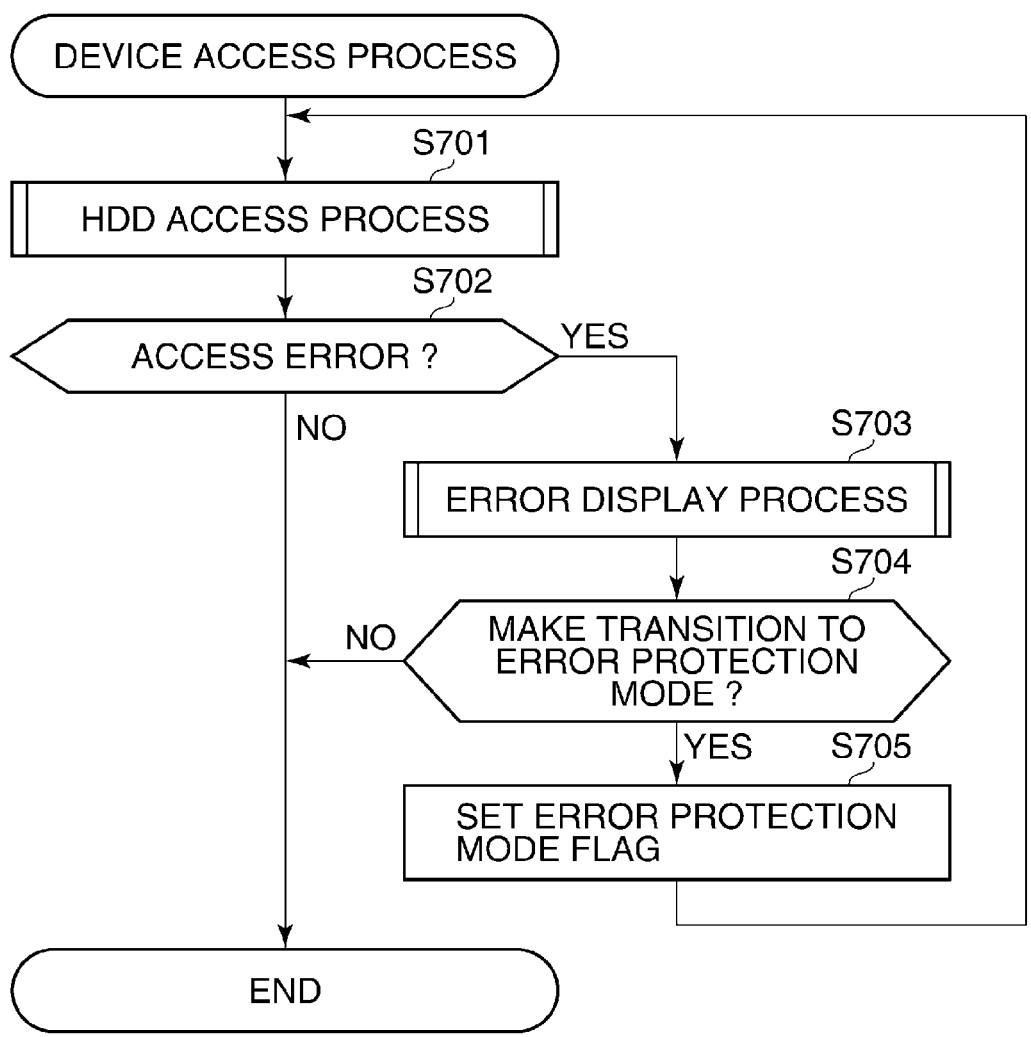
FIG. 3 is a flowchart of the device access process executed by a CPU appearing in FIG. 1.

When there is a request for access to the HDD 106 from an application program or the like, the OS 206 carries out the device access process in accordance with the flowchart of FIG. 3.

FIG. 3 is a flowchart of the device access process carried out by the CPU 102 appearing in FIG. 1.

Referring to FIG. 3, first, the CPU 102 carries out an HDD access process in FIG. 4, described later, to access the HDD 106 (step S701). Next, the CPU 102 determines whether or not there has been a notification of an access error by the HDD access process (step S702).

When, as a result of the determination in the step S702, there has not been a notification of an access error by the HDD access process, that is, when the HDD 106 has been successfully accessed, the CPU 102 terminates the present process.

On the other hand, when, as a result of the determination in the step S702, there has been a notification of an access error by the HDD access process, the CPU 102 carries out an error display process in FIG. 5, described later (step S703). Then, the CPU 102 determines whether or not there has been a notification of an instruction to make a transition to an error protection mode by the error display process (step S704).

When, as a result of the determination in the step S704, there has not been a notification of an instruction to make a transition to the error protection mode by the error display process, the CPU 102 terminates the present process.

On the other hand, when, as a result of the determination in the step S704, there has been a notification of an instruction to make a transition to the error protection mode by the error display process, the CPU 102 proceeds to step S705. In the step S705, the CPU 102 sets an error protection mode flag stored in a nonvolatile storage device such as the SRAM 108, and returns to the step S701.

Figure 4:
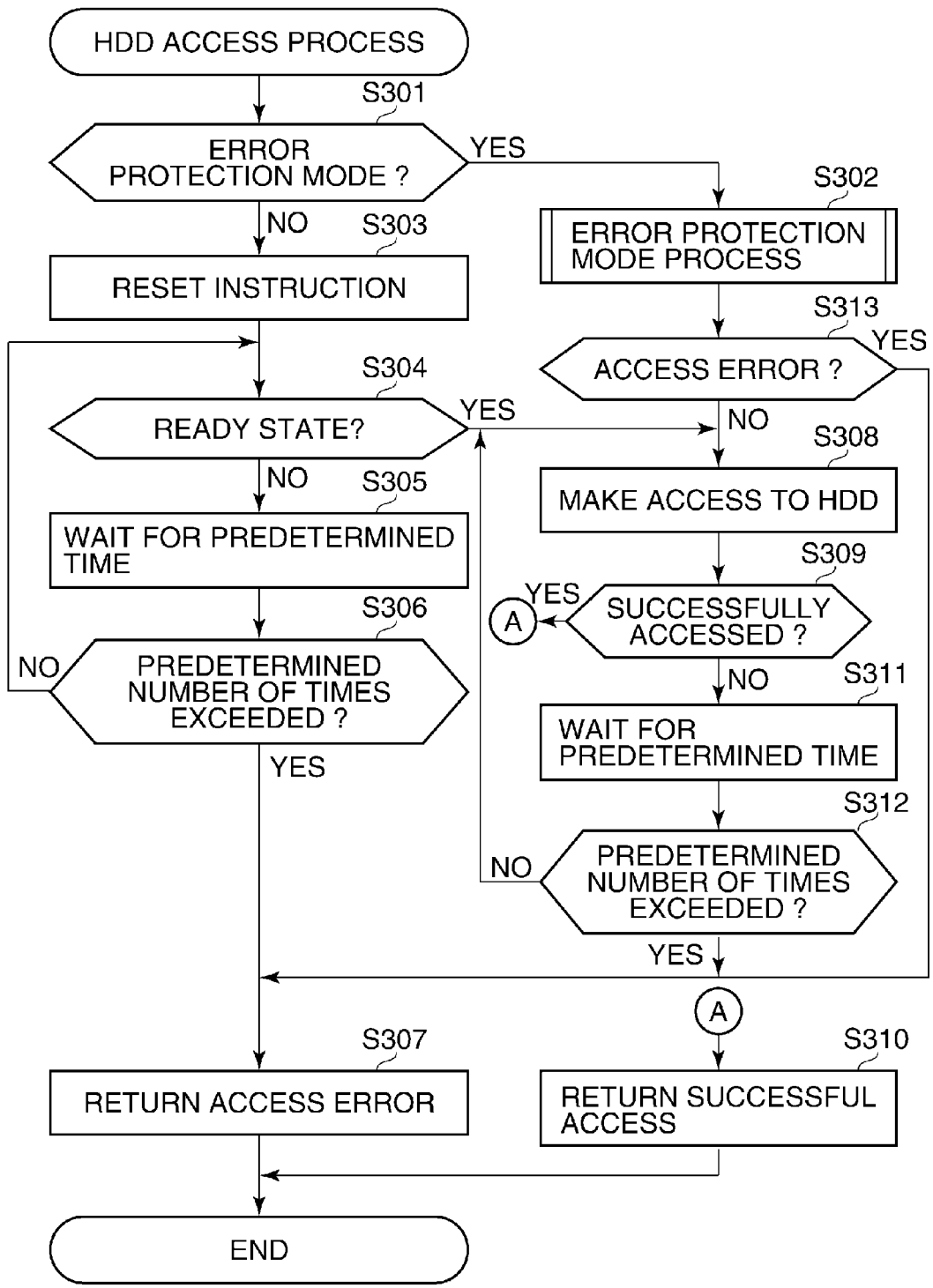
FIG. 4 is a flowchart of an HDD access process in step S701 in FIG. 3.

FIG. 4 is a flowchart of the HDD access process in the step S701 in FIG. 3.

Referring to FIG. 4, first, the CPU 102 determines whether or not the present mode is the error protection mode by referring to the error protection mode flag stored in the nonvolatile storage device such as the SRAM 108 (step S301).

When, as a result of the determination in the step S301, the present mode is the error protection mode, the CPU 102 proceeds to step S302. On the other hand, when, as a result of the determination in the step S301, the present mode is not the error protection mode but a normal mode, the CPU 102 proceeds to step S303.

In the step S302, the CPU 102 carries out an error protection mode process in FIG. 6, described later. Then, the CPU 102 determines whether or not there has been a notification of an access error by the error protection mode process (step S313).

When, as a result of the determination in the step S313, there has been a notification of an access error by the error protection mode process, the CPU 102 proceeds to step S307. In the step S307, the CPU 102 returns the notification of the access error to the OS 206, and terminates the present process.

On the other hand, when, as a result of the determination in the step S313, there has been a notification of successful access by the error protection mode process, the CPU 102 proceeds to step S308. In the step S308, the CPU 102 makes access to the HDD 106 such as reading or writing. Then, the CPU 102 determines whether or not the HDD 106 has been successfully accessed (step S309).

When, as a result of the determination in the step S309, the HDD 106 has been successfully accessed, the CPU 102 returns a notification of successful access to the OS 206 (step S310), and terminates the present process. On the other hand, when, as a result of the determination in the step S309, the HDD 106 has not been successfully accessed, the CPU 102 waits for a predetermined period of time in step S311 and then proceeds to step S312.

In the step S312, the CPU 102 determines whether or not the number of accesses to the HDD 106 exceeds a predetermined number of times. When, as a result of the determination in the step S312, the number of accesses to the HDD 106 does not exceeds the predetermined number of times, the CPU 102 returns to the step S308 wherein it makes access to the HOD 106. On the other hand, when, as a result of the determination in the step S312, the number of accesses to the HDD 106 exceeds the predetermined number of times, the CPU 102 proceeds to the step S307 wherein it returns a notification of an access error to the OS 206, and terminates the present process.

On the other hand, in the step S303, the CPU 102 instructs the disk controller 105 to reset the HDD 106. Then, the CPU 102 determines whether or not resetting of the HDD 106 has been completed, and the HDD 106 has entered a ready state in which it is accessible (step S304).

When, as a result of the determination in the step S304, the HDD 106 has entered the ready state in which it is accessible, the CPU 102 proceeds to the step S308 wherein it makes access to the HDD 106.

On the other hand, when, as a result of the determination in the step S304, the HDD 106 has not entered the ready state in which it is accessible, the CPU 102 proceeds to step S305. In the step S305, the CPU 102 waits for a predetermined period of time stored in the SRAM 108, and then determines whether or not the number of times that the status of the HDD 106 has been checked exceeds a predetermined number of times stored in the SRAM 108 (step S306).

When, as a result of the determination in the step S306, the number of times that the status of the HDD 106 has been checked does not exceed the predetermined number of times stored in the SRAM 108, the CPU 102 returns to the step S304 wherein it determines whether or not the HOD 106 has entered the ready state in which it is accessible.

On the other hand, when, as a result of the determination in the step S306, the number of times that the status of the HDD 106 has been checked exceeds the predetermined number of times stored in the SRAM 108, the CPU 102 returns a notification of an access error to the OS 206 (step S307), and terminates the present process.

Figure 5:
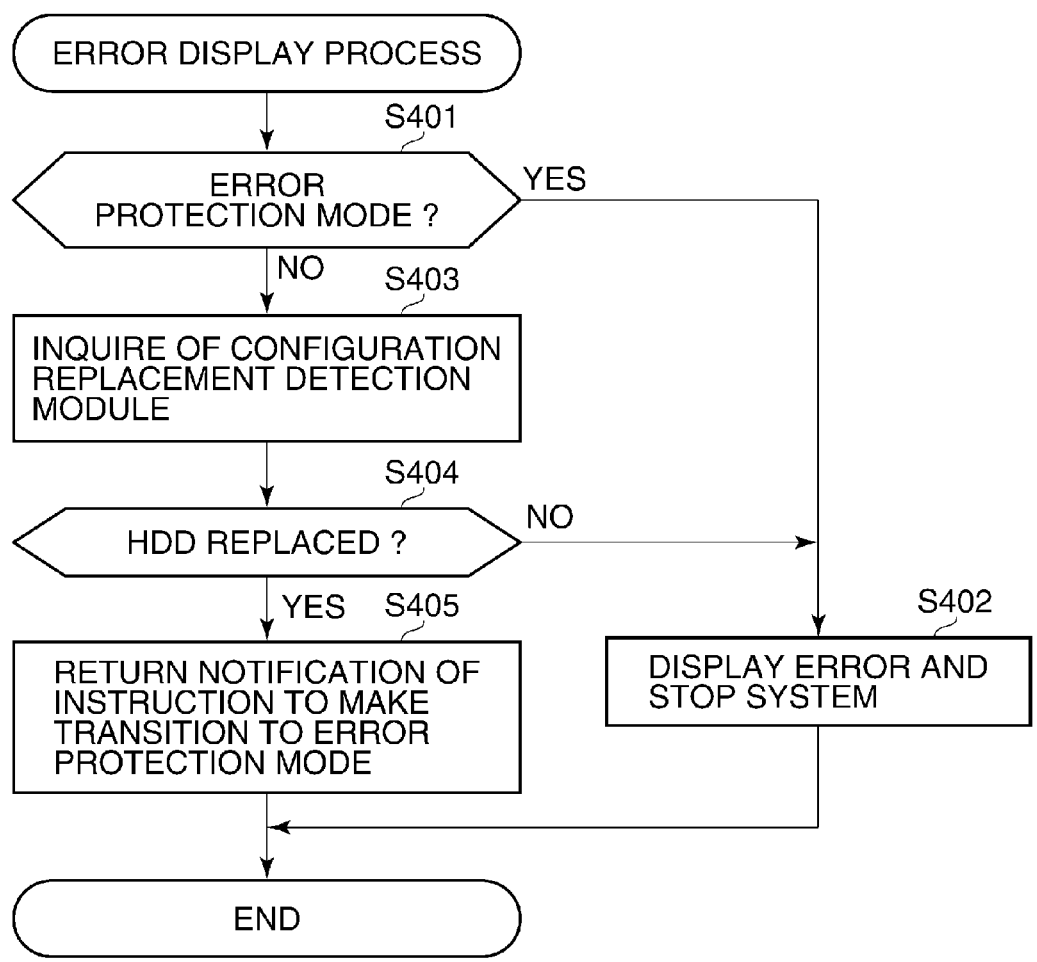
FIG. 5 is a flowchart of an error display process in step S703 in FIG. 3.

FIG. 5 is a flowchart of the error display process in the step S703 in FIG. 3.

Referring to FIG. 5, the error display process is carried out by the error control module 202. First, the CPU 102 determines whether or not the present mode is the error protection mode by referring to the error protection mode flag stored in the nonvolatile storage device such as the SRAM 108 (step S401).

When, as a result of the determination in the step S401, the present mode is the error protection mode, the CPU 102 proceeds to step S402. On the other hand, when, as a result of the determination in the step S401, the present mode is not the error protection mode but the normal mode, the CPU 102 proceeds to step S403.

In the step S403, the CPU 102 inquires of the configuration replacement detection nodule 205 about whether or not there has been an HDD replacement, and determines whether or not there has been an HDD replacement by referring to a reply from the configuration replacement detection nodule 205 (step S404).

When, as a result of the determination in the step S404, there has been no HDD replacement, the CPU 102 proceeds to the step S402. On the other hand, when, as a result of the determination in the step S404, there has been an HOD replacement, the CPU 102 returns a notification of an instruction to make a transition to the error protection mode to the OS 206 (step S405), and terminates the present process.

On the other hand, in the step S402, the CPU 102 provides an error indication and stops the system to terminate the present process.

It should be noted that the configuration replacement detection nodule 205 obtains a model name and a version number by issuing an information request command to the HDD, stores them in a nonvolatile storage device such as the SRAM 108, and ascertains whether or not there is a difference whenever the image forming apparatus is activated.

Figure 6:
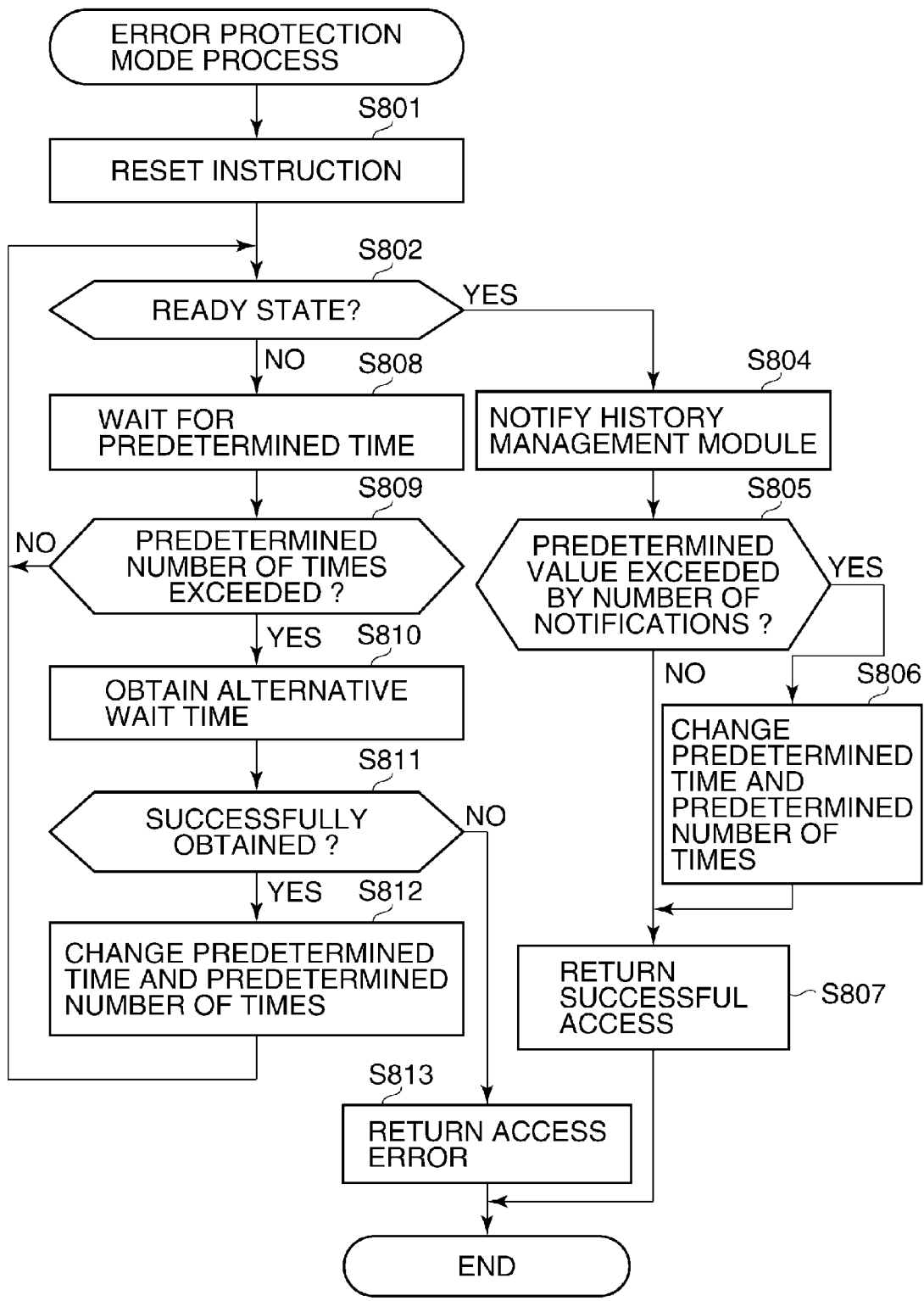
FIG. 6 is a flowchart of an error protection mode process in step S302 in FIG. 4.

FIG. 6 is a flowchart of the error protection mode process in the step S302 in FIG. 4.

Referring to FIG. 6, first, the CPU 102 instructs the disk controller 105 to reset the HDD 106 (step S801).

Next, the CPU 102 determines whether or not the resetting of the HOD 106 has been completed, and the HDD 106 has entered the ready state in which it is accessible (step S802).

When, as a result of the determination in the step S802, the HOD 106 has not entered the ready state in which it is accessible, the CPU 102 proceeds to step S808. On the other hand, when, as a result of the determination in the step S802, the HDD 106 has entered the ready state in which it is accessible, the CPU 102 proceeds to step S804.

In the step S808, the CPU 102 waits for a predetermined period of time stored in the SRAM 108, and then determines whether or not the number of times that the status of the HDD 106 has been checked exceeds the predetermined number of times stored in the SRAM 108 (step S809).

When, as a result of the determination in the step S809, the number of times that the status of the HDD 106 has been checked does not exceed the predetermined number of times stored in the SRAM 108, the CPU 102 returns to the step S802 wherein it determines whether or not the HDD 106 has entered the ready state in which it is accessible.

On the other hand, when, as a result of the determination in the step S809, the number of times that the status of the HDD 106 has been checked exceeds the predetermined number of times stored in the SRAM 108, the CPU 102 proceeds to step S810. In the step S810, the CPU 102 obtains an alternative wait time stored in advance in a nonvolatile storage device such as the SRAM 108. Then, the CPU 102 determines whether or not the alternative wait time has been successfully obtained (step S811).

When, as a result of the determination in the step S811, the alternative wait time has been successfully obtained, the CPU 102 changes the predetermined period of time and the predetermined number of times stored in the SRAM 108 based on the obtained alternative wait time (step S812), and returns to the step S802.

On the other hand, when, as a result of the determination in the step S811, the alternative wait time has not been successfully obtained, that is, any alternative wait time is not set, the CPU 102 returns a notification of an access error to the OS 206 (step S813), and terminates the present process.

In the step S804, the CPU 102 notifies the history management module 204 of information including time intervals between status checks and the number of status checks. The history management module 204 notified of the information stores the contents of notifications and the number of notifications in a nonvolatile storage device such as the SRAM 108 and returns the number of notifications to the OS 206.

In step S805, the CPU 102 determines whether or not the number of notifications returned to the OS 206, that is, the number of times that the HDD 106 has been successfully accessed by processing in the error protection mode exceeds a predetermined value. When, as a result of the determination in the step S805, the number of notifications exceeds the predetermined value, the CPU 102 proceeds to step S806. In the step S806, the CPU 102 sets the time interval between status checks and the number of status checks as predetermined values in the normal mode stored in a nonvolatile storage device such as the SRAM 108 (referred to in the steps S305 and S306), and proceeds to step S807.

On the other hand, when, as a result of the determination in the step S805, the number of notifications does not exceed the predetermined value, the CPU 102 returns a notification of successful access to the OS 206 (step S807), and terminates the present process.

Figure 7:
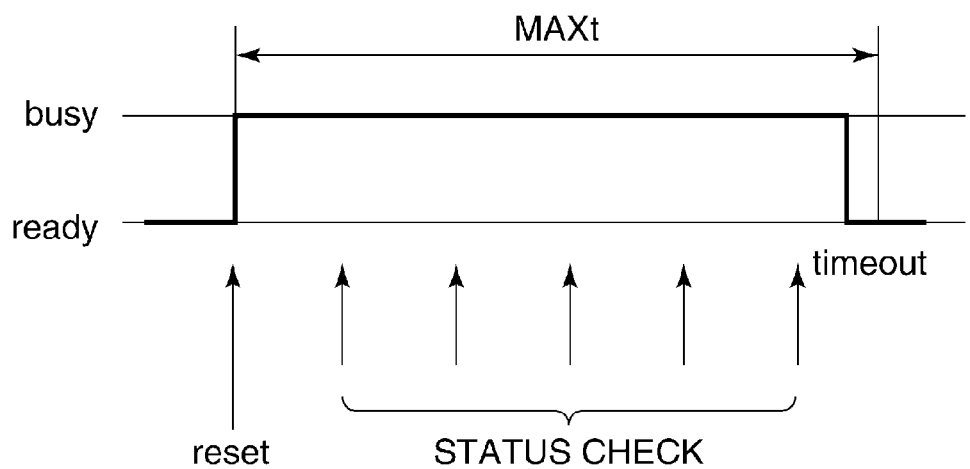
FIG. 7 is a diagram showing a time course until an HDD goes into a ready state in which it is accessible in a case where a reset instruction is given to a disk controller appearing in FIG. 1.
Figure 8:
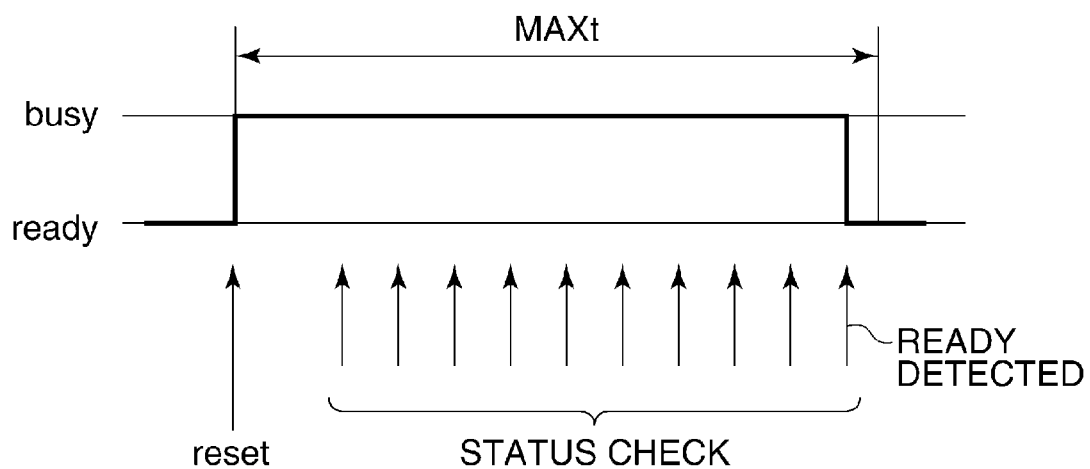
FIG. 8 is a diagram showing a time course until the HDD goes into a ready state in which it is accessible in a case where a reset instruction is given to the disk controller appearing in FIG. 1.

FIGS. 7 and 8 are diagrams showing time courses until the HDD 106 enters the ready state in which it is accessible in a case where a reset instruction is given to the disk controller 105 appearing in FIG. 1.

As shown in FIG. 7, when a reset instruction is given to the disk controller 105, the HDD 106 connected to the disk controller 105 is kept in a reset state (a busy state in FIG. 7) for a period of time up to MAXt. MAXt is determined in advance for each HDD model, and when this is exceeded, it is determined that an HDD has failed.

In the example shown in FIG. 7, after a predetermined wait time, a plurality of status checks are performed within the period of time MAXt, but in timing of status checking, the HDD does not return from the reset state and enter the ready state in which it is ready to accept processing. Thus, the number of status checks exceeds the predetermined number of times, which means that an access error occurs (YES in the step S306 in FIG. 4).

On the other hand, in the error protection mode, as shown in FIG. 8, the time interval at which the status of the HDD 106 is checked after a reset instruction is given to the disk controller 105 is narrowed to, for example, ½ of the interval in FIG. 7. As a result, the HDD 106 having entered the ready state can be detected within the period of time MAXt (YES in the step S802 in FIG. 6).

Although in the error protection mode process according to the present embodiment, the wait time and the number of repetitions are changed with attention focused on timing in which the HDD 106 changes from the reset state to the ready state, the present invention is not limited to this. The resetting of the HDD 106 may be combined with power-off/on of the HOD 106, execution of a self diagnostic mode, and so on. This will increase the probability that normal access is accomplished by the error protection mode process even in a case where an error would arise during access processing in the normal mode.

As described above, according to the present embodiment, when the HDD has not been successfully accessed by the HOD access module, the error process module determines whether or not there has recently been an HDD replacement. When there has recently been an HOD replacement, the HDD access module is notified of a transition to the error protection mode with no error indication being provided. In response to this notification, the HDD access module attempts to make access to the HDD using timing and a method different from those in normal access processing. Information indicative of whether or not the HOD has been successfully accessed by processing in the access error protection mode is recorded, and the HDD access module determines whether or not to carry out processing in the error protection mode by referring to the information at a time of access to the HDD.

As a result, it is possible to prevent the HDD from being unsuccessfully accessed due to a difference in access timing caused by an HDD replacement, and prevent the image forming apparatus from indicating an error and coming to a standstill.

The above description of the first embodiment concerns access to the HDD 106, but regarding other connectable devices, system shutdowns caused by errors can be similarly reduced by attempting an access method different from usual in addition to normal processing.

For example, because a controller of the image forming apparatus has a heat-generating part, a fan is provided so as to reject heat. The fan rotates a motor by passage of current, and rotates a blade connected to the motor, thus producing a flow of air in a predetermined direction. Because the fan uses the motor, its useful life is determined in advance, and when the useful life expires or when a rotary shaft of the fan is displaced due to, for example, clogging with dust, it is necessary to replace the fan with a new fan. When the fan stops, the temperature in the image forming apparatus rises, which may cause breakage of heat-sensitive chips and the like, heat generation, and fire catching. For this reason, there is provided a fan lock detection signal for distinguishing whether or not the motor is rotating.

The device driver 200 appearing in FIG. 2 makes access to the fan. When the device driver 200 determines that the fan lock detection signal has been validated by the device access module 201, the error control module 202 indicates on a display unit such as an LCD that the fan is at a standstill, and turns off power supply to the image forming apparatus after the elapse of a predetermined period of time.

However, in a case where the fan is replaced, it may take time for an RPM of the motor to increase to an RPM at which the fan lock detection signal is not validated after power-on due to motor characteristics, and in this case, it may be recognized that the fan is locked, and an error may be indicated.

Here, as described above in the description of the first embodiment, the configuration replacement detection module 205 determines whether or not the fan has been replaced. When, as a result of the determination, the fan has been replaced, and fan lock is detected, the error protection mode module 203 controls the wait time and the number of times for fan lock detection. As a result, false detection of fan lock due to motor characteristics can be prevented.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-119729 filed May 18, 2009, which is hereby incorporated by reference herein in its entirety.

What is claimed is:

1. An image forming apparatus that has a component element and carries out a predetermined process on the component element, comprising:
   a detection unit adapted to detect whether the component element is replaced;
   a determination unit adapted to determine whether the predetermined process has been normally carried out on the component element when the replacement of the component element is detected;
   an execution unit adapted to carry out another process different from the predetermined process when it is determined that the predetermined process has not been normally carried out;
   a changing unit adapted to change the predetermined process for the component element to the other process when the other process has been normally carried out; and
   a recording unit adapted to record the number of times that the other process has been normally carried out, wherein said changing unit changes the predetermined process to the other process when the number of times recorded in said recording unit exceeds a predetermined value.

2. A control method for an image forming apparatus that has a component element and carries out a predetermined process on the component element, comprising:
   a detection step of detecting whether the component element is replaced;
   a determination step of determining whether the predetermined process has been normally carried out on the component element when the replacement of the component element is detected;
   an execution step of carrying out another process different from the predetermined process when it is determined that the predetermined process has not been normally carried out;
   a changing step of changing the predetermined process for the component element to the other process when the other process has been normally carried out; and
   a recording step of recording the number of times that the other process has been normally carried out, wherein said changing step changes the predetermined process to the other process when the number of times recorded by said recording step exceeds a predetermined value.

3. A non-transitory computer-readable storage medium storing a program for causing a computer to implement a control method for an image forming apparatus that has a component element and carries out a predetermined process on the component element, the control method comprising:
   a detection step of detecting whether the component element is replaced;
   a determination step of determining whether the predetermined process has been normally carried out on the component element when the replacement of the component element is detected;
   an execution step of carrying out another process different from the predetermined process when it is determined that the predetermined process has not been normally carried out;
   a changing step of changing the predetermined process for the component element to the other process when the other process has been normally carried out; and
   a recording step of recording the number of times that the other process has been normally carried out, wherein said changing step changes the predetermined process to the other process when the number of times recorded by said recording step exceeds a predetermined value.

* * * * *